United States Patent
Chou et al.

(10) Patent No.: US 9,441,318 B2
(45) Date of Patent: Sep. 13, 2016

(54) PROCESSING METHOD OF NON-WOVEN INTRINSICALLY WITH ENHANCED DEODORANT FEATURE FROM BAMBOO

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW)

(73) Assignee: ACELON CHEMICAL AND FIBER CORPORATION, Changhua County (TW)

( * ) Notice: Subject to any disclaimer, the term of this patent is extended or adjusted under 35 U.S.C. 154(b) by 493 days.

(21) Appl. No.: 13/911,241

(22) Filed: Jun. 6, 2013

(65) Prior Publication Data
US 2014/0291883 A1    Oct. 2, 2014

(30) Foreign Application Priority Data
Mar. 26, 2013    (TW) .............................. 102110620 A

(51) Int. Cl.
*D04H 3/013* (2012.01)
*D01F 1/10* (2006.01)
(Continued)

(52) U.S. Cl.
CPC ................ *D04H 3/013* (2013.01); *D01F 1/10* (2013.01); *D01F 2/00* (2013.01); *D01F 13/02* (2013.01);
(Continued)

(58) Field of Classification Search
CPC .......... D04H 3/013; D01D 5/04; D01D 5/06; D01D 5/08; D01D 5/088; D01D 5/0885; D01F 8/02; D01F 13/02; D01F 11/02; D01F 2/00; D01F 1/10

USPC ................. 264/103, 172.16, 172.17, 172.11; 162/94; 139/383 A
See application file for complete search history.

(56) References Cited

U.S. PATENT DOCUMENTS

| 4,857,145 A | 8/1989 | Villavicencio |
| 2009/0100655 A1 | 4/2009 | Hung et al. |

(Continued)

FOREIGN PATENT DOCUMENTS

CN         102191579 A  *  9/2011

OTHER PUBLICATIONS

O'Connell, Sanjida, "Clothes made from coffee satisfy eco-friendly fitness fans", The Guardian, Jul. 29, 2009.*
(Continued)

*Primary Examiner* — Alison L Hindenlang
*Assistant Examiner* — Lawrence D Hohenbrink, Jr.
(74) *Attorney, Agent, or Firm* — Bacon & Thomas, PLLC

(57) ABSTRACT

The present invention provides a processing method of non-woven intrinsically with enhanced deodorant feature from bamboo. The process uses mixture of wasted coffee residue and bamboo pulp as raw material. The process uses N-methylmorpholine N-oxide (NMMO) as primary solvent and 1, 3-phenylene-bis 2-oxazoline (BOX) as additive stabilizer. A cellulose solution is firstly formed by the wasted coffee residue, bamboo pulp, NMMO and BOX aforesaid. Secondly, via grinding, blending, dissolving and thermal dehydrating, the cellulose solution is converted into spinning dope. Thirdly, via meltblown method, the dope is extruded out of spinnerets in a die assembly by a metering gear pump to form thread bundle. Finally, the thread bundle is orderly treated by coagulation with regeneration via ejecting mist aerosol of water, rinsing, bleaching, re-rinsing, drying, winding-up and the like to create continuous filaments, then final product for nonwoven with deodorant feature is produced by the filaments from bamboo cellulose.

9 Claims, 4 Drawing Sheets

(51) Int. Cl.
  *D01F 2/00* (2006.01)
  *D01F 13/02* (2006.01)
  *D01F 11/02* (2006.01)
  *D01F 8/02* (2006.01)
  *D01D 5/08* (2006.01)
  *D01D 5/06* (2006.01)
  *D01D 5/088* (2006.01)
  *D01D 5/04* (2006.01)

(52) U.S. Cl.
  CPC *D01D 5/04* (2013.01); *D01D 5/06* (2013.01); *D01D 5/08* (2013.01); *D01D 5/088* (2013.01); *D01D 5/0885* (2013.01); *D01F 8/02* (2013.01); *D01F 11/02* (2013.01); *Y02P 70/627* (2015.11)

(56) References Cited

U.S. PATENT DOCUMENTS

| | | | |
|---|---|---|---|
| 2009/0166916 A1* | 7/2009 | Chou | C08B 37/003 264/207 |
| 2010/0022150 A1 | 1/2010 | Hung et al. | |
| 2011/0154627 A1* | 6/2011 | Chou | D04H 18/00 28/107 |
| 2011/0156299 A1* | 6/2011 | Chou | D04H 3/013 264/103 |
| 2012/0156486 A1* | 6/2012 | Bisjak | D01F 1/07 428/375 |

OTHER PUBLICATIONS

CN 102191579A machine translation Chinese to English.*

* cited by examiner

PROCESSING METHOD OF NON-WOVEN INTRINSICALLY WITH ENHANCED DEODORANT FEATURE FROM BAMBOO

FIELD OF THE PRESENT INVENTION

The present invention relates to a processing method of non-woven intrinsically with enhanced deodorant feature from bamboo particularly for one regarding bamboo pulp with eco-friendly biodegradable feature. The non-woven produced by the present invention in filament manner do really has effect in deodorant capability with excellent degree of air permeability and rate of water absorption so that it can be used in textile, medical or health-care and bioscience fields as well as wafer-cleaning in semiconductor.

BACKGROUND OF THE INVENTION

Currently, for raw materials used in producing non-woven from chemical synthetic fiber, the consumption is polypropylene (PP), polyester (PET), polyethylene (PE) and Nylon in quantity order with overall consumed quantity 96%. However, the wasted fabric of non-woven from chemical synthetic fiber after having been used incurs a malignant impact to the environment because they are un-biodegradable by natural environment. Nowadays, the manufacturers of the natural cellulose fabric gradually divert to use natural materials such as pulp with suitable solution become a mainstream to substitute for raw materials of non-woven from chemical synthetic fiber so that it is so called as eco-friendly fiber or Lyocell fiber as the wasted fabric thereof is biodegradable.

Basing on the article in title of "The technological development and application bamboo charcoal used in textile" publicized by the domestic "Forestry Research Institute in the Council of Agriculture" and research thesis in title of "new regenerated cellulose fiber—bamboo fiber" publicized in the issue 2 of year 2003 of "scientific and technical journals/periodicals" by the "Shandong Province Textile Industry Association" in the Mainland China, it testifies that the bamboo fiber intrinsically has enhanced antiseptic, moisture-absorbing, air-permeating, deodorant and negative-ion health-care features. Moreover, bamboo belong to rapid-growing plant having strong fertility with crop rate to cut down in 2-3 year span and good recycling resource with re-cultivating easiness without any severe ecological destruction to the forest land, which usually happened in cutting down of the timber. Besides, the cost of the bamboo pulp is only one third in the cost of the wood pulp. Therefore, the productions of bamboo fiber by means of solvent means in Lyocell fiber process have been publicized in many patent documents such as Mainland China Invention Patent in Patent Numbers of CN1129680, CN1190531, CN1315624 and CN100395384. However, the common drawback of foregoing Mainland China Invention Patents is lack of deodorant feature and effect on the basis of disclosed specifications thereof.

According to statistical information from the "Tariff Bureau of the Ministry of Finance in Taiwan", it displays that the annual overall imported quantity of the fresh coffee beans in year 2011 is 17,685 metric tons. The annual overall quantity of wasted coffee residue for the imported fresh coffee beans after it having baked and spent is over 8,842 metric tons suppose the ratio of the wasted coffee residue to the fresh coffee beans is ½ normally. So far, most portion of the wasted coffee residue in 8,842 metric tons is disposed by incineration or being buried under ground while only few portions is used as deodorant, nutrition of the plants or cleaning additive. Besides, someone take the wasted coffee residue to fabricate a coffee yarn product such as Taiwan Invention Patent in Number of 1338729, which discloses the process as following.

(a): By selecting raw material from polypropylene (PP), polyester (PET), polyethylene (PE) and Nylon to prepare high polymer granules;

(b): By using wasted coffee residue to serve as property modifier;

(c): By blending foregoing high polymer granules and wasted coffee residue to become granular additive masterbatch; and (d): Spin the granular additive masterbatch into yarns.

The drawback of the foregoing coffee yarn product is that it still incurs a malignant impact to the environment because they are un-biodegradable by natural environment since the high polymer granules also selected from polypropylene (PP), polyester (PET), polyethylene (PE) and Nylon.

Other than the wasted coffee residue in 8,842 metric tons mentioned above, there are bamboo forests of 15 hectares area which is approximately 7.2% of overall tree forest area, in Taiwan too. Having realized foregoing issues, the applicant of the present invention take a long time hard study to perform penetrating and profound research and development in how to take advantages of the biodegradable feature in the bamboo fiber and the deodorant feature in the wasted coffee residue as well as how to integrate these favorable features into a contemplated ideal natural cellulose fiber from bamboo. Eventually, an expected processing method of non-woven intrinsically with enhanced deodorant feature from bamboo of the present invention is worked out successfully after many times of experimental tests in trial implements.

SUMMARY OF THE INVENTION

The primary object of the present invention is to provide a processing method of non-woven intrinsically with enhanced deodorant feature from bamboo with a cellulose solution is firstly formed by the wasted coffee residue, bamboo pulp, N-methylmorpholine N-oxide (NMMO) and 1, 3-phenylene-bis 2-oxazoline (BOX). Then, via grinding, blending, dissolving and thermal dehydrating, the cellulose solution is converted into spinning dope. Subsequently, via meltblown method, the dope is extruded out of spinnerets in a die assembly by a metering gear pump to form thread bundle. Finally, the thread bundle is orderly treated by coagulation with regeneration via ejecting mist aerosol of water, rinsing, bleaching, re-rinsing, drying, winding-up and the like to create continuous filaments, then final product for nonwoven with deodorant feature is produced by the filaments from bamboo cellulose. In overall process, the non-toxic N-methylmorpholine N-oxide (NMMO) is used as primary solvent, which is also fully recycled and recovered into fresh manner for reuse. By combination the raw materials of the wasted coffee residue with eco-friendly biodegradable feature and the bamboo pulp with deodorant feature, the non-woven produced by the present invention in filament manner do really has effect in deodorant capability with excellent degree of air permeability and rate of water absorption so that it will not create any harmful effect to the environment either during manufacturing process or becoming wasted disposal after usage.

DETAILED DESCRIPTION OF THE PREFERRED EMBODIMENTS

Figure 1:
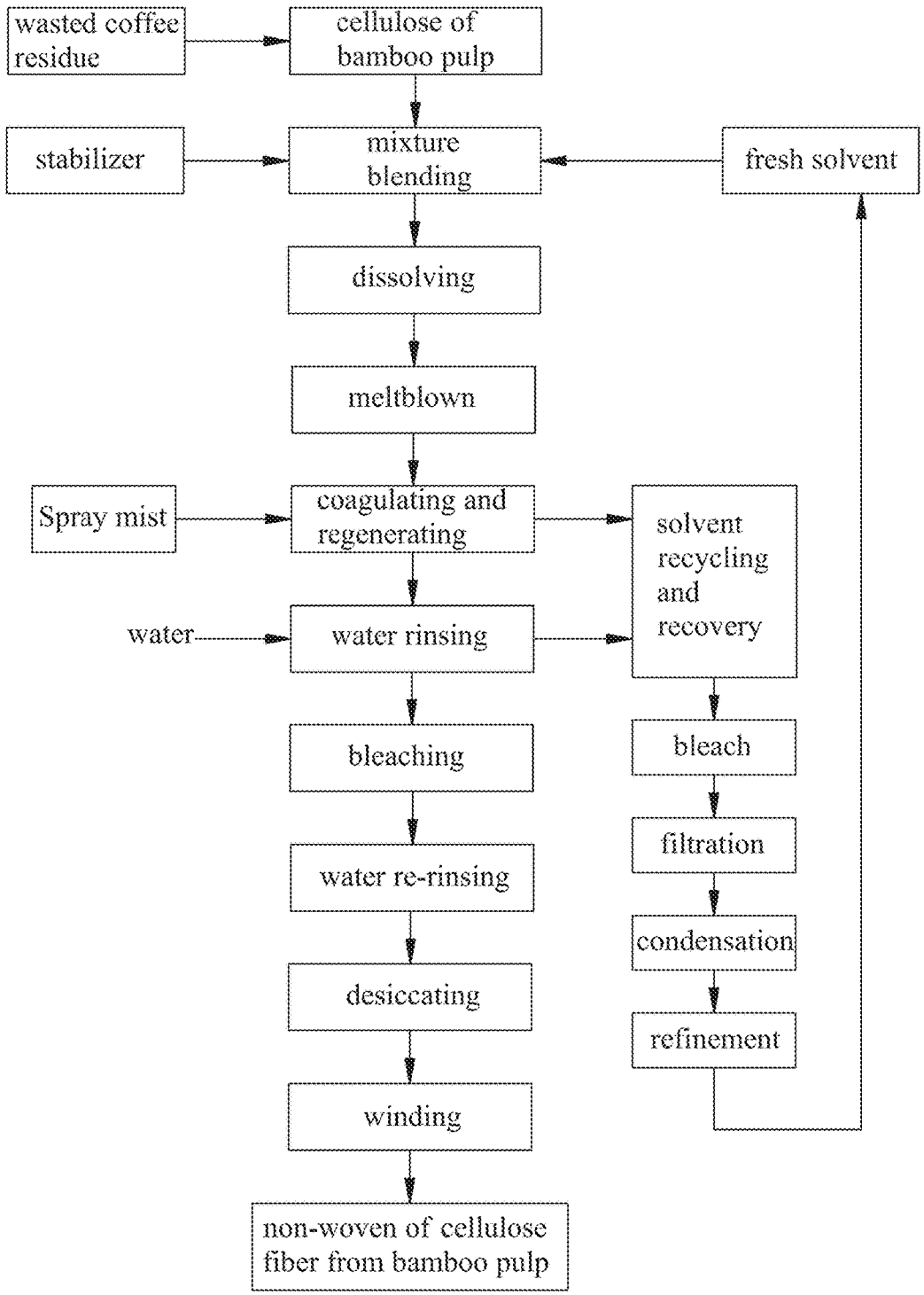
FIG. 1 is a flow chart of block diagram showing the fabricating process of the present invention.
Figure 2:
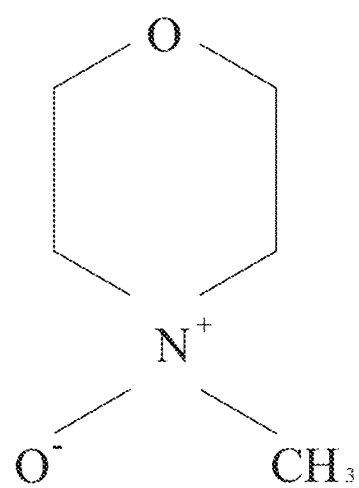
FIG. 2 is a chemical structure of the (N-methylmorpholine N-oxide, called NMMO for short) used in the present invention.
Figure 3:
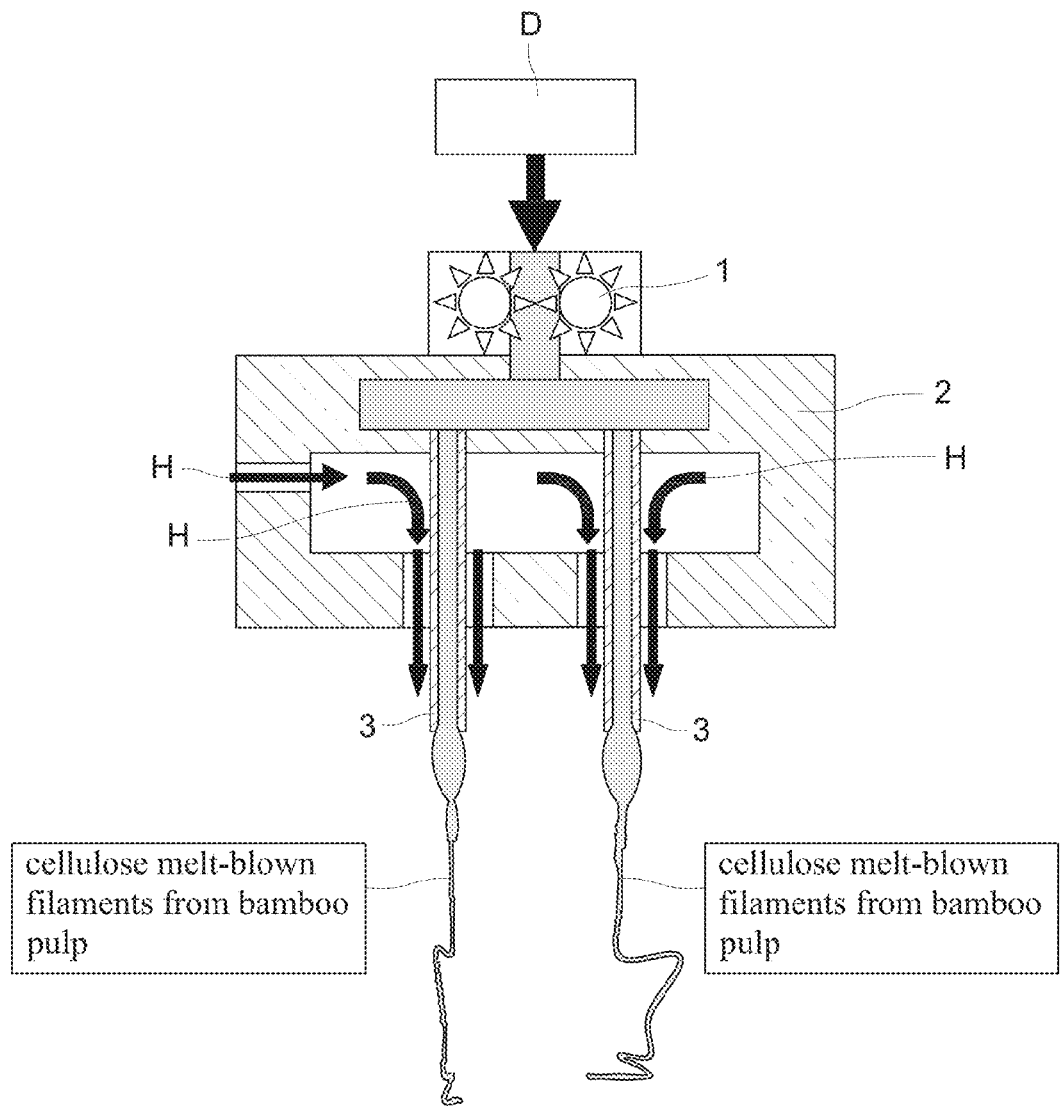
FIG. 3 is an operational schematic view showing a forming process for cellulose melt-blown filaments from bamboo pulp of the present invention.
Figure 4:
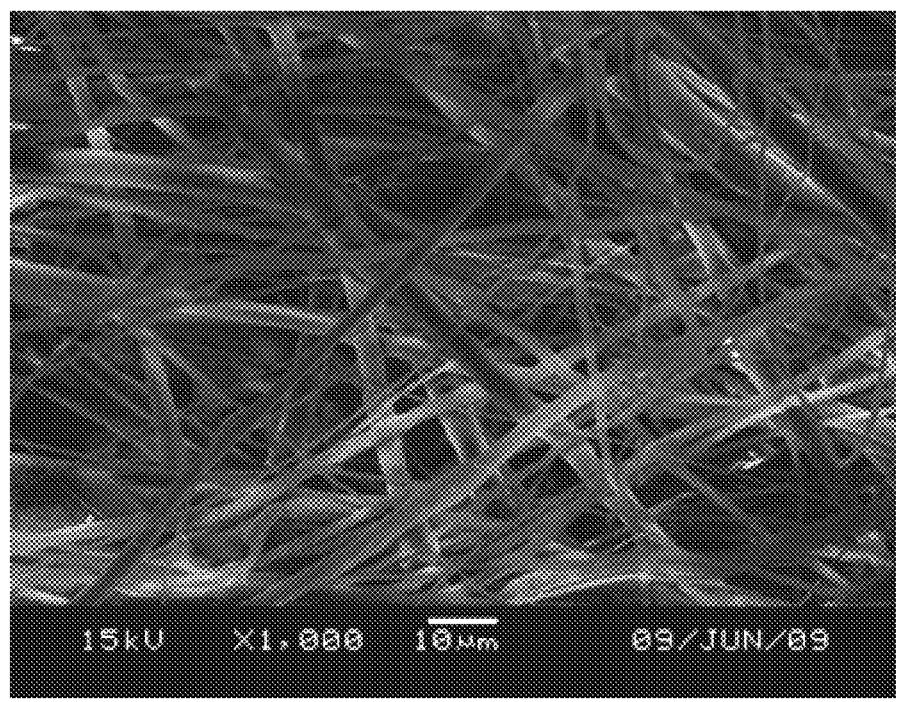
FIG. 4 is an enlarged schematic view with 1000 times of magnification by an electron microscope showing a non-woven fabric produced from natural cellulose of bamboo pulp for the present invention.

For further disclose the fabricating process and efficacy, detailed description for some preferred exemplary embodiments with associated drawings is presented below. Please refer to FIGS. 1 through 4, which showing the "processing method of non-woven intrinsically with enhanced deodorant feature from bamboo" of the present invention with process comprising following steps.

a. Material Selection and Preparation: Select bamboo pulp and wasted coffee residue as raw material to blend together mutually into a mixture, preferably the cellulose content of the bamboo pulp being over 65% and the range for degree of polymerization (DP) being 400-800 while the wasted coffee residue having been ground into range of 500 nm-1000 nm (nano-meter) granules in high speed mode;

b. Dope Blending and Dissolution: By putting N-methylmorpholine N-oxide (NMMO), whose chemical structure as shown in FIG. 2, as primary dissolving solvent and 1,3-phenylene-bis 2-oxazoline (BOX) as additive stabilizer into prepared bamboo pulp mixture obtained from previous step a for blending and dissolving under low temperature in range of 50 degree of Celsius and 70 degree of Celsius (50° C.-70° C.) via rapid grinding of a horizontal dope blending machine; and, by means of cellulose features of high expanding, moistening and dissolving ability as well as high rate of dissolving speed affected by the N-methylmorpholine N-oxide (NMMO) to expedite mutually blending and dissolving effect for forming a slurry; then, dehydrate it via heating up to temperature in range of 80 degree of Celsius and 100 degree of Celsius (80° C.-100° C.) by vacuum thin film evaporator (VTFE) for 5 minutes to decrease water content thereof in range down to 5-13% so that a homogenized mucilaginous dope D is formed;

c. Meltblown and Thread Formation: By meltblown method, the dope D is extruded out of spinnerets 3 to form thread bundle as shown in FIG. 3, the dope D is subsequently fed into a die assembly 2 and forcedly extruded out of spinnerets 3 via a quantitative metering gear pump 1 to form thread bundle of bamboo cellulose, wherein certain hot air H is continuously fed therein for circulation around peripheral then discharged out via surrounding of the spinnerets 3 so that the dope D is meltblown and extruded out of the spinnerets 3 to form thread bundle of bamboo cellulose; and d. Coagulation, Web and Fabric Formation: The thread bundle is orderly treated by coagulation with regeneration via ejecting mist aerosol of water, water rinsing, bleaching, water re-rinsing, drying, winding-up and the like to create continuous filament (as shown in FIG. 4), then final product for nonwoven fabrics are produced by the continuous filament from natural bamboo cellulose.

Wherein, the weight content of the wasted coffee residue in the prepared bamboo pulp mixture of step a aforesaid is in a range of 0.5 wt %-5 wt %.

Wherein, additive stabilizer 1, 3-phenylene-bis 2-oxazoline (BOX) in above step b functions to subdue the declining recession for the color and degree of polymerization (DP) of bamboo cellulose. Whereas, the primary dissolving solvent N-methylmorpholine N-oxide (NMMO) in above steps b is nontoxic with concentration range of 45%-75% so that it is recycled with low consumption rate after having been drained out in water rinse process with a range for rate of recovery up to over 99.7%. Thereby, it completely complies with the eco-friendly criteria of the environmental protection because it not only can reduce the manufacturing cost but also will not incur any harmful pollution to the environment.

Moreover, for the dope D in above step b, the content percentage of cellulose thereof is 6 wt %-15 wt %, the viscosity thereof is 300-3000 poise, the light transmittance index thereof is 1.470-1.495, and the melting Index thereof is 200-1000.

Besides, for the non-woven fabric of bamboo cellulose in above step d, the winding speed in the winding process thereof is in range of 2-200 meter per minute, the range on basis weight thereof is 10-300 g/m2, the range on fineness (or fiber number) of fiber thereof is 1-15 urn, the strength in machine direction (MD) thereof is over 14 kgf while the strength in cross direction (CD) thereof is over 7 kgf, and the range on degree of air permeability thereof is 100-3500 (cm3/cm2/min) while the range on degree of water absorption thereof is 300-2000%.

Furthermore, wherein in above step d, the primary NMMO dissolving solvent used in the process of the present invention is liberated after coagulating, regenerating in coagulation bath and water rinsing process. The actual procedure of the primary NMMO dissolving solvent recovery includes steps as below:

1. Bleach: Adopting Absorption Method of the Suspended Active Carbon.

Put 0.05%-0.10% active carbon powder of good absorptivity and suspension ability into the liquid of NMMO solvent to be de-colored, then alternate the air-blast mixing with absorption and the stationary suspending absorption treatments in treating time ratio is 1:3 to 1:6 for 8 hours to finish the bleaching procedure so that not only the related equipments can be simplified but also the energy can be saved as well as the bleaching effect can be promoted.

2. Filtration: Adopting Two Filtering Stages.

First coarse filtering stage: for simplifying the equipment, general cartridge filter is used together with the auxiliary filtering agent, which is pre-coated over the surface of the cartridge filter, and put 0.03%-0.05% of leavening agents into the liquid to be filtrated for not only preventing the active carbon from accumulating on the surface thereof in hindering the filtering speed but also regularly maintaining filtering effect of high performance without decay. The composition of said auxiliary filtering agent is preferably made of diatomite and cellulose in ratio of 4:1. After completion of the coarse filtering stage, the filtering dregs and residual liquid are centrifugal and dehydrating treated for recovery so that the residual auxiliary filtering agent dehydrated is reused as auxiliary filtering effect being remained.

Second fine filtering stage: by means of fine filter UF, the purity of the filtered liquid is the same as fresh NMMO solvent.

The features of this two filtering stages in coarse filtering stage and fine filtering stage are low equipment cost, low consumption rate, high treating quantity and high purity.

3. Condensation: Concurrently Combining Two Condensing Methods.

To recover the rinsing liquid in the present invention, the condensing load in dehydration is very large in manner of approximately 90 tons per ton of fiber as solvent concentration must be condensed from range of 6.5%-8.0% to range of 50%-55%.

For low yield quantity of fiber, the tri-effect condensing method is adopted to dehydrate per ton of rinsing liquid in using 0.5 ton of steam (high steam consumption, low electric power consumption);

For high yield quantity of fiber, the Mechanical Vapor Recompression (MVR) condensing method is adopted to dehydrate per ton of rinsing liquid in using 0.003-0.03 ton of steam (low steam consumption, high electric power consumption);

The yield condensed solvent and water in both foregoing condensing methods are also completely recovered for reusing though each condensing method is only suitable for different specific yield quantity of fiber. Wherein, the yield condensed solvent is reused as processing solvent and yield condensed water is reused to rinse fiber.

4. Refinement: Adopting Oxidation and Neutralizing Reduction Under Low Temperature of 80 Degree of Celsius (80° C.):

Using 35% hydrogen peroxide ($H_2O_2$) as oxidant and 85% hydrazine hydrate ($N_2H_4 \cdot H_2O$) as neutralizing reductant, the result is measured by electric potential titrating method; the NMMO content is decreased down below 10 ppm so that not only the purity of NMMO is promoted but also the NMMO consumption is decreased.

For further understanding the feature and practical efficacy of the present invention, the experimental embodiments with various tests in accordance with process thereof are described in detail as below.

Embodiment 1

Samples in Number 1-10 for the Present Invention

Put wasted coffee residue into selected bamboo pulp with degree of polymerization (DP) in range of 400-800 to mutually blend together with primary dissolving solvent N-methylmorpholine N-oxide (NMMO) and various additive ratios of stabilizer 1, 3-phenylene-bis 2-oxazoline (BOX) to form a slurry via blending, dissolving and rapid grinding processes under temperature in range of 50 degree of Celsius and 70 degree of Celsius (50° C.-70° C.). Then, dehydrate it via heating up to temperature in range of 80 degree of Celsius and 100 degree of Celsius (80° C.-100° C.) by vacuum thin film evaporator (VTFE) for 5 minutes to decrease water content thereof down to range of 5-13% so that a homogenized mucilaginous dope is formed. By meltblown method, the dope D is extruded out of spinnerets 3 to form thread bundle, the dope D is subsequently fed into a die assembly 2 and forcedly extruded out of spinnerets 3 via a quantitative metering gear pump 1 to form thread bundle of bamboo cellulose. And, by means of ejecting mist aerosol of water, the thread bundle is coagulated with regeneration; After post treatments of water rinsing, bleaching, water re-rinsing, drying, winding-up and the like have been orderly applied, then final product for nonwoven fabrics of continuous filament are produced from natural bamboo cellulose. The compositions of various dopes from bamboo cellulose for samples 1 through 10 are shown in table 1.

TABLE 1

Composition of dope from bamboo cellulose for samples 1 through 10

| | S | | | | | | | |
|---|---|---|---|---|---|---|---|---|
| | DP in BC | AR of AR | DR for DP | CP of CL | CP of SV | CP of WT | VC of DP | LTI of DP |
| U | nil | wt % | % | % | % | % | poise | nil |
| 1 | 500 | 0.05% | 27.4 | 7.2 | 82.3 | 10.5 | 820 | 1.485 |
| 2 | 500 | 0.10% | 23.8 | 8.1 | 82.9 | 9.0 | 920 | 1.484 |
| 3 | 500 | 0.15% | 18.7 | 8.9 | 81.8 | 9.3 | 1040 | 1.488 |
| 4 | 500 | 0.20% | 15.6 | 8.5 | 81.2 | 10.3 | 980 | 1.484 |
| 5 | 500 | 0.25% | 14.3 | 8.2 | 81.4 | 10.4 | 960 | 1.482 |
| 6 | 750 | 0.05% | 26.5 | 7.4 | 81.9 | 10.7 | 1140 | 1.483 |
| 7 | 750 | 0.10% | 22.7 | 8.5 | 81.6 | 9.9 | 1460 | 1.481 |
| 8 | 750 | 0.15% | 19.9 | 9.4 | 82.8 | 7.8 | 1620 | 1.484 |
| 9 | 750 | 0.20% | 15.8 | 8.1 | 82.5 | 9.4 | 1180 | 1.480 |
| 10 | 750 | 0.25% | 14.1 | 7.8 | 81.4 | 10.8 | 1220 | 1.482 |

Notation
S = sample
U = unit
DP in BC = degree of polymerization in bamboo cellulose
AR of AR = additive ratio of anti-recession stabilizer for DP
DR for DP = decay rate for degree of polymerization
CP of CL = content percentage of cellulose
CP of SV = content percentage of solvent
CP of WT = content percentage of water
VC of DP = viscosity of dope
LTI of DP = light transmittance index of dope Embodiment 2

Samples in Number 11-20 for the Present Invention

Subsequently, perform strength test of nonwoven for samples 11 through 20, which are prepared into different basis weights of nonwoven in accordance with respective degree of polymerization (DP) and additive ratio of anti-recession stabilizer for DP shown in TABLE 1, by criteria of CNS5610 with following procedure.

1. Specimen Preparation:
Respectively obtain 10 pieces of specimens for each cross direction (CD) and mechanical direction or machine direction (MD) with specimen length being over 180 mm and specimen width being 2.54 mm.

2. Strength Testing Method:
By using universal strength testing machine with holding width for specimen holding jaws of testing fixture being set 76 mm under crosshead speed for extension test being set 300 mm/min, respectively perform strength test for each of 10 testing specimens.

3. Testing Results:
Respective strengths of nonwoven for samples 11 through 20 of nonwoven are listed in following TABLE 2.

TABLE 2

Properties of dope from bamboo cellulose for samples 11 through 20

| | S | | | | | |
|---|---|---|---|---|---|---|
| | DP in BC | AR of AR | BW of NW | SMD of NW | SCD of NW | FN of FB |
| U | nil | wt % | g/m² | kgf | kgf | μm |
| 11 | 500 | 0.05% | 75 | 13.1 | 7.3 | 3.2 |
| 12 | 500 | 0.10% | 76 | 14.0 | 7.9 | 2.8 |

TABLE 2-continued

Properties of dope from bamboo cellulose for samples 11 through 20

| S | | | | | |
|---|---|---|---|---|---|
| DP in BC | AR of AR | BW of NW | SMD of NW | SCD of NW | FN of FB |
| | | | U | | |
| nil | wt % | g/m² | kgf | kgf | μm |
| 13  500 | 0.15% | 75 | 15.1 | 7.1 | 3.5 |
| 14  500 | 0.20% | 74 | 15.0 | 6.9 | 3.8 |
| 15  500 | 0.25% | 75 | 14.5 | 6.8 | 3.9 |
| 16  750 | 0.05% | 75 | 14.8 | 6.8 | 4.5 |
| 17  750 | 0.10% | 74 | 14.2 | 8.1 | 4.8 |
| 18  750 | 0.15% | 76 | 13.7 | 8.7 | 5.1 |
| 19  750 | 0.20% | 75 | 14.6 | 8.5 | 4.7 |
| 20  750 | 0.25% | 75 | 14.1 | 8.6 | 5.2 |

Notation
S = sample
U = unit
DP = degree of polymerization
AR of AR = additive ratio of anti-recession stabilizer for DP
BW of NW = basis weight of nonwoven
SMD of NW = strength in machine direction of nonwoven
SCD of NW = strength in cross direction of nonwoven
FN of FB = fineness (or fiber number) of fiber

Embodiment 3

Samples in Number 21-32 for the Present Invention

Now, perform air permeability test and water absorption test for samples 21 through 32, which are prepared in accordance with respective degree of polymerization (DP) and basis weights of nonwoven, by criteria of CNS5612 with following procedure.

1. Air Permeability Test:

Respectively obtain 4 pieces of specimens with specimen dimension being 26×26 cm2 for each sample. By using Textest FX 3300 Air Permeability Tester, respectively perform test for each of 12 specimens 21 through 32.

2. Water Absorption Test:

Respectively obtain 5 longitudinal pieces of specimens with specimen width being 76 mm, specimen weight being 5.0±0.1 g and specimen length being determined in accordance with the specimen weight. For testing procedure of water absorption test: firstly, put each specimen in a holding basket, and then dunk the holding basket with specimens in water in totally immersion manner for 10 seconds; secondly, lift the holding basket with specimens out of the water to drip water for 10 seconds; and finally, put the holding basket with specimens into a measuring glass of known weight to measure overall gross weight with 0.1 g precision.

The degree/rate of water absorption for specimen is calculated by following formula:

$$\text{Rate/degree of Water Absorption } RAw(\%) = \left| \frac{[W_A(g) - W_D(g)]}{W_D(g)} \right| \times 100$$

Where, $RA_w$ denotes to rate of water absorption for each specimen while $W_D$ denotes to specimen dry weight before dunking in water, and WA denotes to specimen wet weight after dunking in water.

3. Testing Results:

Respective rates of air permeability and rates of water absorption for samples 21 through 32 of nonwoven are listed in following TABLE 3.

TABLE 3

Properties of dope from bamboo cellulose for samples 21 through 32

| S | | | | |
|---|---|---|---|---|
| DP in BC | BW of NW | FN of FB | DAP for NW | RWA for NW |
| | | U | | |
| nil | g/m² | μm | kgf | kgf |
| 21  500 | 25 | 3.1 | 2680 | 410 |
| 22  500 | 75 | 2.6 | 665 | 480 |
| 23  500 | 125 | 3.6 | 248 | 550 |
| 24  500 | 175 | 2.4 | 225 | 650 |
| 25  500 | 225 | 3.6 | 202 | 720 |
| 26  500 | 300 | 3.2 | 185 | 1120 |
| 27  750 | 25 | 4.2 | 2890 | 320 |
| 28  750 | 75 | 4.6 | 650 | 450 |
| 29  750 | 125 | 5.0 | 250 | 550 |
| 30  750 | 175 | 4.9 | 240 | 700 |
| 31  750 | 225 | 5.2 | 225 | 780 |
| 32  750 | 300 | 3.8 | 188 | 1150 |

Notation
S = sample
U = unit
DP = degree of polymerization
BW of NW = basis weight of nonwoven
FN of FB = fineness (or fiber number) of fiber
DAP for NW = degree of air permeability for nonwoven
RWA for NW = rate of water absorption for nonwoven

Embodiment 4

Samples in Number 33-44 for the Present Invention

1. Specimen Preparation:

Respectively obtain 12 specimens for samples 33 through 44 of nonwoven by various added rates of degree of polymerization (DP) and wasted coffee into spinning dope for testing and assessing deodorant effect.

2. Deodorant Testing Method:

The test for evaluating deodorant effect is based on absorption of the ammonia odor. The testing method is performed in following steps.

Step 1: fill the ammonia gas of specific concentration into the air-tight bottle;

Step 2: put the sample of bamboo cellulose fiber for the present invention in specific quantity into the same bottle aforesaid; and Step 3: measure the gas concentration in the sample of bamboo cellulose fiber before and after putting into the bottle by gas chromatograph (GC).

The ratio of the deodorant property (DOP) for ammonia absorption rate test is calculated by following formula.

(DOP) for test on rate of ammonia absorption:
$DOP = (Ca - Cr)/Ca$

Where, Ca is the gas concentration in the sample fiber before absorbing ammonia while Cr is the gas concentration in the sample fiber after absorbing ammonia.

3. Testing Results:

Respective rates of ammonia absorption for samples 33 through 44 of nonwoven are listed in following TABLE 4.

TABLE 4

Deodorant capability test of nonwoven from bamboo cellulose fiber

| S | | | |
|---|---|---|---|
| DP in BC | Added ratio of coffee residue | Rate of Ammonia absorption | Testing Results |
| | | U | |
| nil | wt % | % | Yes/No |
| 33 | 500 | 25 | 3.1 | Yes |
| 34 | 500 | 75 | 2.6 | Yes |
| 35 | 500 | 125 | 3.6 | Yes |
| 36 | 500 | 175 | 2.4 | Yes |
| 37 | 500 | 225 | 3.6 | Yes |
| 38 | 500 | 300 | 3.2 | Yes |
| 39 | 750 | 25 | 4.2 | Yes |
| 40 | 750 | 75 | 4.6 | Yes |
| 41 | 750 | 125 | 5.0 | Yes |
| 42 | 750 | 175 | 4.9 | Yes |
| 43 | 750 | 225 | 5.2 | Yes |
| 44 | 750 | 300 | 3.8 | Yes |

Notation
S = sample
U = unit
DP = degree of polymerization
BW of NW = basis weight of nonwoven
FN of FB = fineness (or fiber number) of fiber
DAP for NW = degree of air permeability for nonwoven
DWA for NW = degree of water absorption for nonwoven As demonstrated by the samples 11 through 20 in the TABLE 2 and samples 21 through 32 in the TABLE 3, the nonwoven fabric produced from natural bamboo cellulose by the present invention features very ideal strength either in mechanical direction (MD) or cross direction (CD) as well as better rate/degree of air permeability and rate/degree of water absorption for nonwoven than conventional nonwoven produced either from chemical synthetic fiber or conventional natural fiber. Moreover, as verified by the samples 33 through 44 in the Table 4 above, the nonwoven fabric produced from natural bamboo cellulose by the present invention has excellent deodorant capability due to containing wasted coffee residue so that it meet medical and industrial application requirements such as apparels, sanitary and medical materials, filtrating materials, wiping materials for biomedical and optoelectronic wafers and the like. In conclusion of disclosure heretofore, the present invention not only has advantages in eco-friendly feature due to biodegradability of natural bamboo cellulose but also has advantages in deodorant feature due to nature of wasted coffee residue.

Accordingly, the present invention becomes an environment protective process with novelty and practical usage, which meet the criterion of patentability. Therefore, we submit the patent application in accordance with related patent law.

What is claimed is:

1. A method for producing a continuous filament for making non-woven fabrics with enhanced deodorant features, wherein the method comprises the following steps:
    a. blending bamboo pulp and wasted coffee residue together into a mixture, wherein the bamboo pulp comprises cellulose having a degree of polymerization (DP) from 400-800, and the wasted coffee residue has been ground into particles with a diameter of 500 nm-1000 nm;
    b. adding N-methylmorpholine N-oxide (NMMO) as a dissolving solvent and 1,3-phenylene-bis 2-oxazoline (BOX) as an additive stabilizer into the mixture of step a. and blending and dissolving the mixture at a temperature of 50° C.-70° C. using a horizontal dope blending machine to form a slurry;
    c. dehydrating the slurry of step b. by vacuum thin film evaporation (VTFE) and heating at a temperature of 80° C.-100° C. to form a mucilaginous dope;
    d. extruding the mucilaginous dope of step c. out of spinnerets by a meltblown method to form a thread bundle; and
    e. treating the thread bundle of step d. by rinsing with water, bleaching, drying and winding-up to create a continuous filament for making non-woven fabrics with enhanced deodorant features.

2. The method of claim 1, wherein in step a. the mixture of bamboo pulp and wasted coffee residue comprises 0.5 wt %-5 wt % of wasted coffee residue.

3. The method of claim 1, wherein in step b. the slurry comprises 6 wt %-15 wt % of cellulose.

4. The method of claim 1, wherein in step c. the viscosity of the mucilaginous dope is 300-3000 poise.

5. The method of claim 1, wherein in step e. the winding speed in the winding-up process is 2-200 meters per minute.

6. The method of claim 1, wherein in step e. the strength in machine direction (MD) of the non-woven fabric is over 14 kgf while the strength in cross direction (CD) of the non-woven fabric is over 7 kgf.

7. The method of claim 1, wherein in step e. the range on fineness (or fiber number) of fiber for the non-woven fabric is 1-15 um.

8. The method of claim 1, wherein in step e. the range on degree of air permeability of the non-woven fabric is 100-3500 (cm3/cm2/min).

9. The method of claim 1, wherein in step c. the slurry is heated at a temperature of 80° C.-100° C. for 5 minutes.

* * * * *